(12) United States Patent
Murakami (10) Patent No.: US 8,558,488 B2
(45) Date of Patent: Oct. 15, 2013

(54) VIBRATION-TYPE MOTOR CONTROLLER AND OPTICAL APPARATUS

(75) Inventor: Junichi Murakami, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 486 days.

(21) Appl. No.: 12/880,769

(22) Filed: Sep. 13, 2010

(65) Prior Publication Data

US 2011/0068718 A1    Mar. 24, 2011

(30) Foreign Application Priority Data

Sep. 18, 2009   (JP) .................................. 2009-216607

(51) Int. Cl.
*H02K 33/00*    (2006.01)

(52) U.S. Cl.
USPC ...... 318/114; 318/115; 318/135; 318/400.14; 318/721; 318/799

(58) Field of Classification Search
USPC ............ 318/114, 115, 119, 135, 139, 400.01, 318/400.14, 503, 556, 568.18, 599, 807, 318/811, 799, 280, 812, 606, 118, 721; 310/316, 323.02, 317, 323, 328; 388/812, 813, 814
See application file for complete search history.

(56) References Cited

U.S. PATENT DOCUMENTS

| | | | | |
|---|---|---|---|---|
| 5,889,350 A | * | 3/1999 | Yamamoto | 310/316.01 |
| 6,100,654 A | * | 8/2000 | Izukawa et al. | 318/114 |
| 7,701,116 B2 | * | 4/2010 | Atsuta | 310/317 |
| 2005/0046308 A1 | * | 3/2005 | Endo | 310/317 |

FOREIGN PATENT DOCUMENTS

| | | |
|---|---|---|
| JP | 4-075479 A | 3/1992 |
| JP | 06-237584 A | 8/1994 |
| JP | 10-210775 A | 8/1998 |

* cited by examiner

*Primary Examiner* — Antony M Paul
(74) *Attorney, Agent, or Firm* — Rossi, Kimms & McDowell LLP (57) ABSTRACT

A vibration-type motor controller controls a driving speed of a vibration-type motor relatively moving a vibrating body in which a vibration is excited by an electromechanical energy conversion element 20 to which a first frequency signal and a second frequency signal having a phase difference are applied, and a contacting body which contacts the vibrating body. The vibration-type motor controller includes a speed controller 1 configured to alternately switch a frequency control which changes frequencies of the first and second frequency signals while fixing the phase difference and a phase difference control which changes the phase difference while fixing the frequency so that at least one of a plurality of frequency controls or a plurality of phase difference controls are included to increase and decrease the driving speed of the vibration-type motor.

6 Claims, 10 Drawing Sheets

FIG. 1

VIBRATION PHASE
DIFFERENCE θs

VIBRATION-TYPE MOTOR CONTROLLER AND OPTICAL APPARATUS

BACKGROUND OF THE INVENTION

1. Field of the Invention

The present invention relates to a controller which controls a drive speed of a vibration-type motor.

2. Description of the Related Art

A vibration-type motor includes a vibrating body which is made of a metal elastic body or the like to which an electromechanical energy conversion element (also referred to as a piezoelectric element or an electrostrictive element) is bonded, and a contacting body which is pressed to be in contact with the vibrating body. When a plurality of frequency signals having a phase difference are applied to the piezoelectric element, a vibration (for example, a progressive vibrational wave) is excited and the vibrating body and the contacting body are relatively moved to generate a driving force.

Figure 11A:
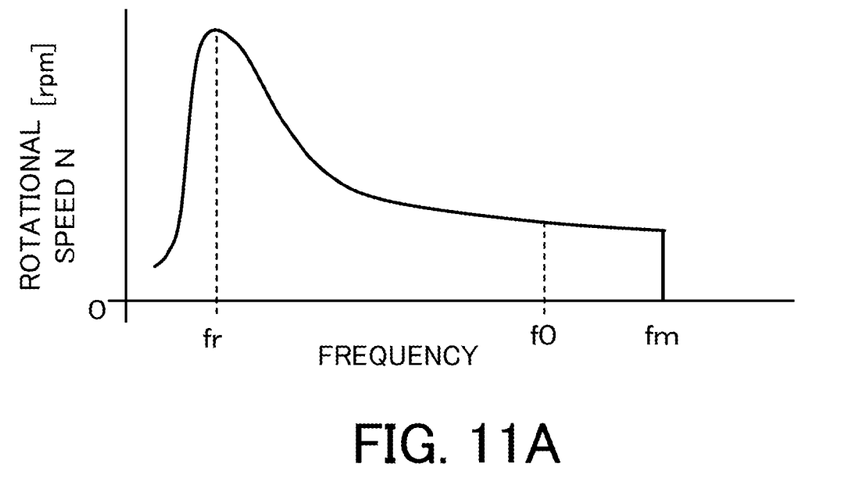
FIGS. 11A and 11B are characteristic diagrams of a vibration-type motor.

As a speed control method of such a vibration-type motor, there is a method of changing a frequency of a frequency signal which is applied to the piezoelectric element (hereinafter, referred to as a frequency control). The relationship between the frequency and the speed is as illustrated in FIG. 11A. The maximum speed can be obtained at a resonance frequency (fr), and the speed is lowered as the frequency is away from the resonance frequency. This is because the diameter of an elliptical orbit which is depicted by a mass point on a surface of the vibrating body is increased as the frequency is closer to the resonance frequency. The characteristic of the frequency and the speed shows a stable characteristic of a moderate speed change at a high-frequency side with reference to the resonance frequency, as compared with a characteristic at a low-frequency side with reference to the resonance frequency. Therefore, for easiness of the control, the speed control is performed in a frequency range at the high-frequency side with reference to the resonance frequency in many cases. The vibration-type motor decelerates as the frequency is higher, and it stops by losing the driving force by the friction between the vibrating body and the contacting body at a predetermined frequency (fm).

Figure 11B:
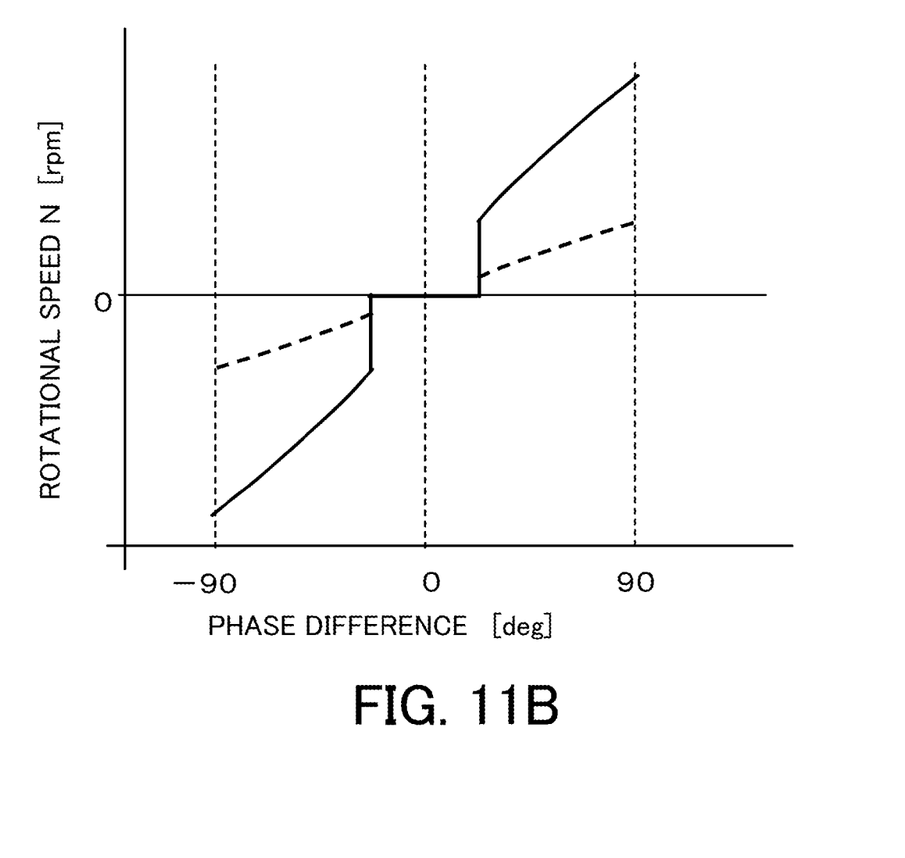

As another speed control method of the vibration-type motor, there is a method of changing a phase difference of a plurality of frequency signals which are applied to the piezoelectric element (hereinafter, referred to as a phase difference control). The relationship between the phase difference and the speed is as illustrated in FIG. 11B. When the phase difference is set to 90 degrees or −90 degrees, the maximum speed can be obtained, and the speed is lowered as the phase difference is away from ±90 degrees. This is because the ratio of a vibration amplitude in a relative movement direction of the vibrating body and the contacting body and a vibration amplitude in a direction perpendicular to the relative movement direction is changed and therefore the shape of the elliptical orbit of the mass point is changed. This is different from a case in which the frequency is changed to change the diameter of the elliptical orbit to change the speed.

The characteristic indicated by a solid line in FIG. 11B is a characteristic of a case in which the frequency is set to the resonance frequency (fr), and the characteristic indicated by a dashed line is a characteristic of a case in which the frequency is set to a frequency (f0) that is higher than the resonance frequency illustrated in FIG. 11A and that is lower than the frequency fm. In both frequencies, the speed of the vibration-type motor is unstable if the phase difference is away from ±90 degrees, and it stops if the phase difference comes close to zero. The speed obtained at the frequency f0 is lower than a case in which the frequency is set to the resonance frequency (fr), and the speed is lower than the minimum speed obtained by the change of the frequency or the amplitude.

Considering the speed control characteristic of the vibration-type motor, the frequency control and the phase difference control are combined to be able to widen a controllable speed range. Japanese Patent Laid-open No. 6-237584 and Japanese Patent Laid-open No. 4-75479 disclose a method of controlling the speed of the vibration-type motor by combining the frequency control and the phase difference control.

Japanese Patent Laid-open No. 6-237584 discloses a speed control method of improving the resolution of the speed control by combining the frequency control and the phase difference control. Japanese Patent Laid-open No. 4-75479 discloses a speed control method of combining the frequency control and the phase difference control for the purpose of lowering the driving speed immediately before the stop in the phase difference control.

In the speed control method disclosed in Japanese Patent Laid-open No. 6-237584, the speed control resolution by the phase control is set to be small with respect to the speed control resolution by the frequency control. When the speed cannot come close to a target speed by the frequency control in the same speed range, the control is switched to the phase control only once to come close to the target speed. In other words, in a specific speed range, the speed control resolution is just improved by switching the control method only once, and it does not widen a controllable speed range. Accordingly, the original speed variable range in which the vibration-type motor can be driven cannot be sufficiently used.

In the speed control method disclosed in Japanese Patent Laid-open No. 4-75479, when the difference between a real driving position and a target driving position of an object to be driven by the vibration-type motor is smaller than a predetermined value, the frequency control is switched to the phase difference control only once. This is not necessarily switched to the phase control at a frequency close to the frequency fm described above, and the original speed variable range in which the vibration-type motor can be driven cannot be sufficiently used.

SUMMARY OF THE INVENTION

The present invention provides a vibration-type motor controller capable of sufficiently using an original speed variable range of a vibration-type motor.

A vibration-type motor controller as one aspect of the present invention controls a driving speed of a vibration-type motor relatively moving a vibrating body in which a vibration is excited by an electromechanical energy conversion element to which a first frequency signal and a second frequency signal having a phase difference are applied, and a contacting body which contacts the vibrating body. The vibration-type motor controller includes a speed controller configured to alternately switch a frequency control which changes frequencies of the first and second frequency signals while fixing the phase difference and a phase difference control which changes the phase difference while fixing the frequencies so that at least one of a plurality of frequency controls or a plurality of phase difference controls are included to increase and decrease the driving speed of the vibration-type motor.

A vibration-type motor controller as another aspect of the present invention controls a driving speed of a vibration-type motor relatively moving a vibrating body in which a vibration is excited by an electromechanical energy conversion element to which a first frequency signal and a second frequency signal having a phase difference are applied, and a contacting body which contacts the vibrating body. The vibration-type motor controller includes a speed controller configured to switch a first speed control and a second speed control. The first speed control alternately switches a frequency control which changes frequencies of the first and second frequency signals while fixing the phase difference and a phase difference control which changes the phase difference while fixing the frequencies so that at least one of a plurality of frequency controls or a plurality of phase difference controls are included to increase and decrease the driving speed of the vibration-type motor. The second speed control performs the frequency control without performing the phase difference control to increase and decrease the driving speed of the vibration-type motor.

An optical apparatus having the vibration-type motor controller, a vibration-type motor, and an optical element or a member to be driven which is driven by the vibration-type motor also constitutes another aspect of the present invention.

Further features and aspects of the present invention will become apparent from the following description of exemplary embodiments with reference to the attached drawings.

DESCRIPTION OF THE PREFERRED EMBODIMENTS

Exemplary embodiments of the present invention will be described below with reference to the accompanied drawings.

Embodiment 1

Figure 1:
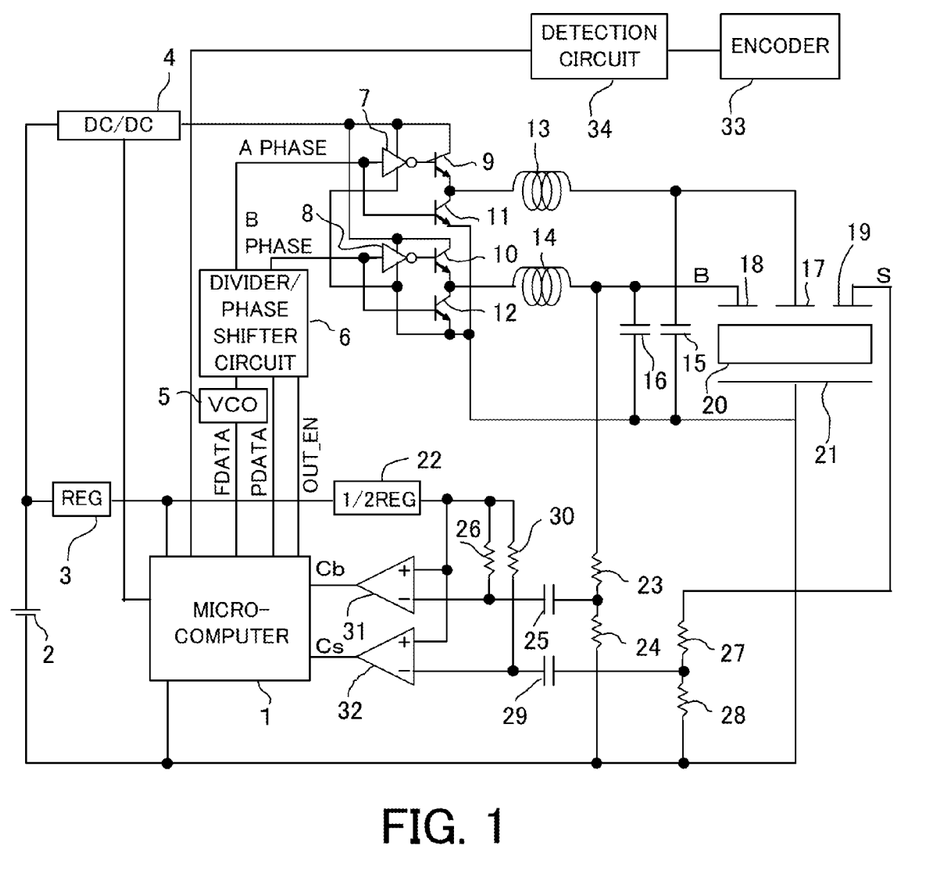
FIG. 1 is a block diagram illustrating a configuration of a vibration-type motor controller that is Embodiment 1 of the present invention.

FIG. 1 illustrates a configuration of a vibration-type motor controller that is Embodiment 1 of the present invention. Reference numeral 1 denotes a microcomputer as a speed controller which controls a driving speed of a vibration-type motor. Reference numeral 2 denotes a power supply (a battery). Reference numeral 3 denotes a regulator, and an output voltage from the regulator 3 is supplied to the microcomputer 1 and is also used as a reference power supply of a phase detection described below.

Reference numeral 4 denotes a boost-type DC-DC converter as a power supply circuit which supplies a power to the vibration-type motor. The DC-DC converter 4 is controlled by the microcomputer 1 whether it operates or does not operate.

Reference numeral 5 denotes a voltage control oscillator (VCO), which generates a voltage based on a frequency data signal (FDATA) inputted from the microcomputer 1 to generate a frequency voltage depending upon the voltage. In the present embodiment, the frequency data signal (FDATA) is 8-bit data, and the frequency is maximized when FDATA is equal to H00 (FDATA=H00) and the frequency is minimized when FDATA is equal to HFF (FDATA=HFF). The frequency obtained when FDATA is equal to H00 is a sufficiently-high frequency with reference to a resonance frequency of the vibration-type motor.

Reference numeral 6 denotes a divider/phase shifter circuit, and the frequency voltage from the VCO 5 and a phase difference data signal (PDATA) from the microcomputer 1 are inputted to the divider/phase shifter circuit 6. The divider/phase shifter circuit 6 outputs an A-phase rectangular wave signal and a B-phase rectangular wave signal that are respectively a first frequency signal and a second frequency signal having a phase difference depending upon the phase difference data signal. In the embodiment, two frequency signals are used, but three or more frequency signals may also be used. Hereinafter, the A-phase rectangular wave signal and the B-phase rectangular wave signal are referred to as an A-phase signal and a B-phase signal (or simply an A phase and a B phase), respectively. A phase difference between the A-phase signal and the B-phase signal is referred to as a driving phase difference θk, which is distinguished with a vibrating phase difference that is a phase difference to detect a vibration state described below.

The present embodiment describes a case in which a rectangular wave signal is used as a frequency signal, but a signal other than the rectangular wave signal such as a sine wave signal can also be used as a frequency signal.

In the present embodiment, the phase difference data signal (PDATA) is 8-bit data, the driving signal phase difference is 0 degree (the same phase) when PDAA is equal to H00 (PDATA=H00), and the driving signal phase difference is 180 degrees (the anti-phase) when PDATA is equal to H80 (PDATA=H80). In the divider/phase shifter circuit 6, outputs of the two rectangular wave signals (the A phase and the B phase) are enabled or inhibited in accordance with an output enable signal (OUT-EN) inputted from the microcomputer 1.

Reference numeral 7 denotes an inverter at an A-phase side, and reference numeral 8 denotes an inverter at a B-phase side. Reference numeral 9 denotes an NPN transistor for supplying a power to the A-phase side, reference numeral 10 denotes an NPN transistor for supplying a power to the B-phase side, and reference numeral 11 denotes an NPN transistor at the A-phase side, and reference numeral 12 denotes an NPN transistor at the B-phase side. The A-phase signal from the divider/phase shifter circuit 6 is inputted to the inverter 7 at the A-phase side and the NPN transistor 11 at the A-phase side. The output of the inverter 7 is connected with a base of the NPN transistor 9, and the power is sunk or sourced to the A-phase side of the vibration-type motor. Similarly, the B-phase signal from the divider/phase shifter circuit 6 is inputted to the inverter 8 at the B-phase side and the NPN transistor 12 at the B-phase side. The output of the inverter 8 is connected with a base of the NPN transistor 10, and the power is sunk or sourced to the B-phase side of the vibration-type motor.

Reference numeral 13 denotes an A-phase side coil, reference numeral 14 denotes a B-phase side coil, reference numeral 15 denotes an A-phase side capacitor, and reference numeral 16 denotes a B-phase side capacitor. The A-phase side coil 13 and the A-phase side capacitor 15 are directly connected with respect to the power supply to apply a boost voltage depending upon the frequency of the A-phase signal to an A-phase side electrode 17 of the vibration-type motor. Similarly, the B-phase side coil 14 and the B-phase side capacitor 16 are directly connected with respect to the power supply to apply a boost voltage depending upon the frequency of the B-phase signal to a B-phase side electrode 18 of the vibration-type motor.

Actually, as described above, the boost voltages corresponding to the A-phase signal and the B-phase signal are applied to the A-phase side electrode 17 and the B-phase side electrode 18 of the vibration-type motor, and it is stated that the A-phase signal and the B-phase signal are applied, i.e. the frequency signals are applied, to the vibration-type motor in the present embodiment. Furthermore, hereinafter, the boost voltages corresponding to the A-phase signal and the B-phase signal are also referred to as an A-phase voltage and a B-phase voltage, respectively.

Reference numeral 19 denotes an S-phase electrode, provided at the vibration-type motor, as a detection terminal (a sensor terminal) of the vibration phase difference. Reference numeral 20 denotes a piezoelectric element (also called an electrostrictive element) as an electromechanical energy transduction element. Reference numeral 21 denotes a ground (GND) electrode.

Reference numeral 22 denotes a voltage dividing circuit for dividing the output voltage of the regulator 3 into halves, which forms a threshold voltage of a comparator.

Reference numerals 23 and 24 are resistors which are used for performing a level shift of the B-phase voltage, and reference numerals 25 and 26 are high-pass filters used for the B-phase voltage. Reference numerals 27 and 28 are resistors used for performing a level shift of a voltage of an S-phase signal (an S-phase voltage) described below, and reference numerals 29 and 30 are high-pass filters used for the S-phase voltage.

Reference numeral 31 denotes a comparator used for the B phase, which performs a level shift of the B-phase voltage to the voltage of the regulator 3 and also performs a waveform shaping of the B-phase voltage. Reference numeral 32 denotes a comparator used for the S phase, which performs a level shift of the S-phase voltage to the voltage of the regulator 3 and also performs a waveform shaping of the S-phase voltage.

Figure 2:
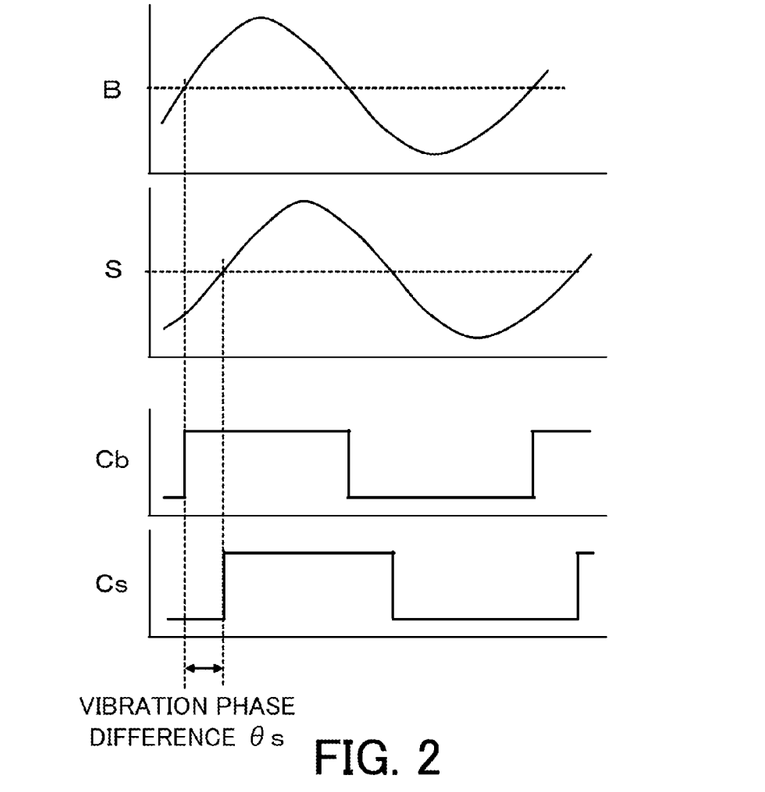
FIG. 2 is a diagram illustrating a method of detecting a vibration phase difference in Embodiment 1.

FIG. 2 illustrates a method of detecting a vibration phase difference. FIG. 2 illustrates a voltage waveform of the B-phase signal (B) which is applied to the B-phase side electrode 18, and a voltage waveform of the S-phase signal (S) which is outputted from the S-phase side electrode 19. In addition, FIG. 2 illustrates waveforms of digital output signals (Cb, Cs) which are obtained by performing digital conversions of the B-phase signal (B) and the S-phase signal (S) using the comparators 31 and 32.

A phase difference between the B-phase signal (B) and the S-phase signal (S) is referred to as a vibration phase difference $\theta s$. The output signals Cb and Cs from the comparators 31 and 32 are inputted to the microcomputer 1 and the period from a time at which the output signal Cb is changed to H to a time at which the output signal Cs is changed to H is measured by a timer function of the microcomputer 1 to be able to obtain the vibration phase difference $\theta s$.

Reference numeral 33 denotes an encoder which detects an amount of rotation and a rotational speed (a driving speed) of the vibration-type motor. The encoder 33 includes, for example, a pulse plate which rotates in synchronization with the rotation of the vibration-type motor and a photo interrupter. A plurality of slits are formed radially from the rotational center in the pulse plate. The photo interrupter outputs a signal in accordance with the switching of a light transmitting state and a light shielding state along with the rotation of the pulse plate (the slit).

Reference numeral 34 denotes a detection circuit provided for the encoder 33, which amplitudes a faint output signal from the photo interrupter to generate a pulse signal to be inputted to the microcomputer 1. The pulse number of the pulse signal is counted by a count function of the microcomputer 1 to be able to detect the amount of rotation. In addition, the pulse width of the pulse signal is measured by a timing measurement using a timer function of the microcomputer 1 to be able to detect the rotational speed.

Figure 3:
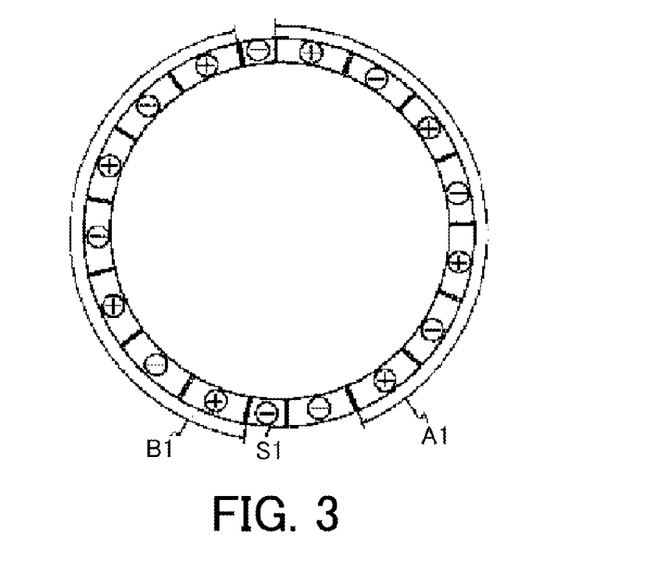
FIG. 3 is a diagram illustrating an arrangement of piezoelectric elements in a vibration-type motor which is used in Embodiment 1.

Next, referring to FIG. 3, the configuration of the vibration-type motor will be described. The vibration-type motor includes a stator (a vibrating body) which is not shown, a rotor (a contacting body), and a biasing mechanism such as a member using a spring which applies a pressure between the rotor and the stator to be in contact with each other. FIG. 3 illustrates a piezoelectric element which is disposed on a surface opposite to a contact surface of the stator with the rotor.

A1 and B1 denote piezoelectric elements for the A phase and the B phase, respectively. Encircled symbols + and − in the drawing denote polarized states of the respective piezoelectric elements. S1 denotes a piezoelectric element for the S phase disposed at a position where a phase is shifted by 45 degrees with reference to the piezoelectric element B1 for the B phase.

The A-phase side electrode 17, the B-phase side electrode 18, and the S-phase side electrode 19, illustrated in FIG. 1, are electrodes disposed with respect to the piezoelectric element A1 for the A phase, the piezoelectric element B1 for the B phase, and the piezoelectric element S1 for the S phase, respectively.

When the A-phase signal and the B-phase signal are applied to the A-phase side electrode 17 and the B-phase side electrode 18, a vibration is excited in the stator by the electromechanical energy transducing function of the piezoelectric element 20 and a progressive vibrational wave is formed on a surface of the stator. Thus, the stator and the rotor which applies a pressure to be in contact with the surface of the stator are relatively moved (a relative rotation: in the embodiment, the rotor is rotated with respect to the stator) to generate a driving force.

The piezoelectric element S1 for the S phase outputs a frequency signal depending upon a vibrational wave formed in the stator via the S-phase side electrode 19. In a resonance state, the vibration phase difference between the B-phase signal and the S-phase signal is a value determined by a phase relationship between the piezoelectric elements B1 and S1. In the present embodiment, at the time of a positive rotation of the vibration-type motor, the resonance state is obtained when the vibration phase difference is 45 degrees, and on the other hand, at the time of a reverse rotation, the resonance state is obtained when the vibration phase difference is 135 degrees. As it is farther from the resonance state, the vibration phase difference is larger with reference to a value obtained in the resonance state.

Figure 4A:
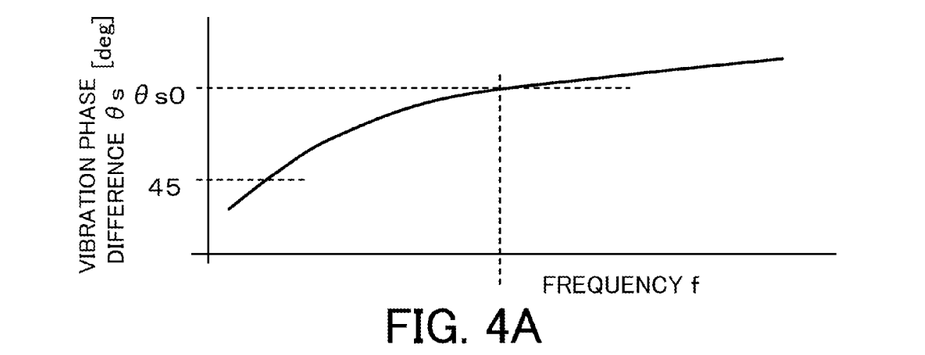
FIGS. 4A to 4C are characteristic diagrams of a vibration-type motor which is used in Embodiment 1.

FIG. 4A illustrates a characteristic of a frequency and a vibration phase difference of the vibration-type motor at the time of the positive rotation. A horizontal axis indicates a driving frequency f that is a frequency of the B-phase signal (and the A-phase signal), and a vertical axis indicates a vibration phase difference θs. In the drawing, the driving frequency f becomes higher to the right, and the vibration phase difference θs becomes smaller in a downward direction. The vibration phase difference θs becomes smaller as the driving frequency f is lower.

Figure 4B:
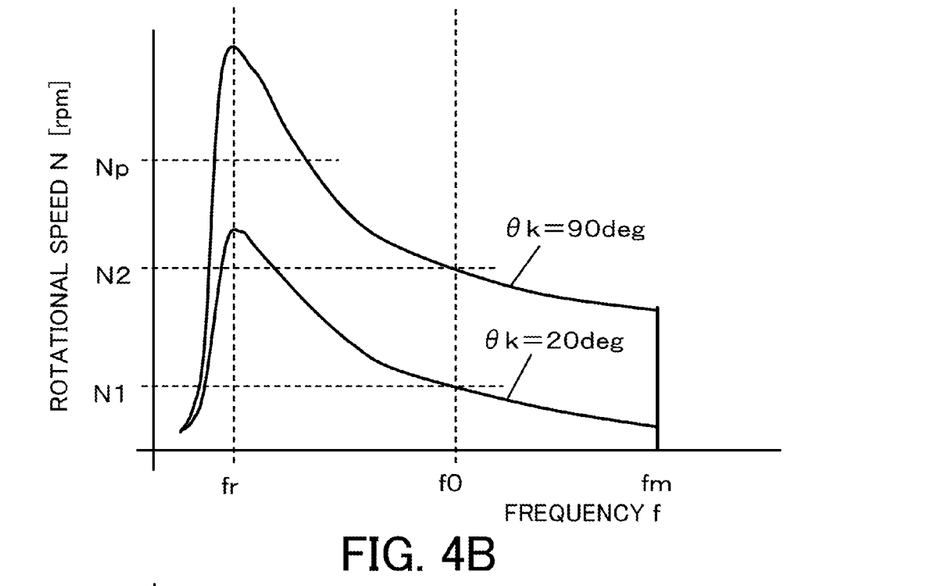

FIG. 4B illustrates a characteristic of a frequency and a rotational speed of the vibration-type motor at the time of a positive rotation. A horizontal axis denotes a driving frequency f, and a vertical axis denotes a rotational speed N. In the drawing, the driving frequency f becomes higher to the right, and the rotational speed N becomes higher in an upward direction. In the drawing, the characteristics obtained when the driving phase differences θk are 90 degrees and 20 degrees are indicated. In the case where any one of the driving phase difference θk is given, the driving frequency f is changed from the higher to the lower frequency to start the rotation at a frequency (a starting frequency) fm, and the frequency is lowered to raise the number of the rotation (the driving speed).

When the driving phase difference θk is 90 degrees, a range of a higher rotational speed can be used, but a range of a lower rotational speed cannot be used. On the other hand, when the driving phase difference θk is 20 degrees, the range of the lower rotational speed can be used, but the range of the higher rotational speed cannot be used. A frequency at which the minimum rotational speed is obtained at any one of the driving phase differences θk is not fixed, and may be changed depending upon an individual variability of the vibration-type motor, or a driving environment such as temperature or humidity. Accordingly, when the driving speed of the vibration-type motor is reduced, the frequency at which, as a speed control method, a frequency control described below is changed to the phase difference control needs to be set to a sufficiently-low frequency.

Figure 4C:
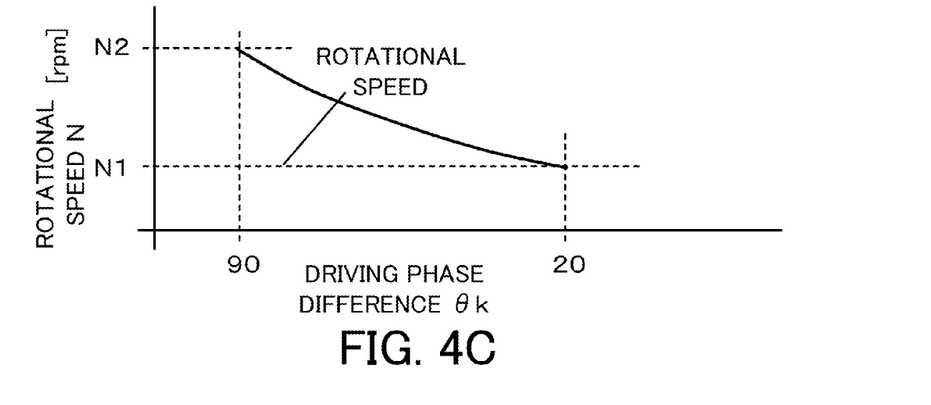

FIG. 4C illustrates a characteristic of a driving phase difference and a rotational speed of the vibration-type motor at the time of the positive rotation. A horizontal axis indicates a driving phase difference θk, and a vertical axis indicates a rotational speed N. The characteristic of the driving phase difference and the rotational speed illustrated in FIG. 4C is obtained when the driving frequency is set to a frequency f0 that is a sufficiently-higher frequency relative to the resonance frequency and that is lower than the starting frequency fm, as illustrated in FIGS. 4A and 4B. The rotational speed becomes N1 when the driving phase difference is set to 20 degrees, and the rotational speed becomes N2 when the driving phase difference is set to 90 degrees.

In the present embodiment, based on the characteristics illustrated in FIGS. 4A to 4C, an original speed range of the vibration-type motor can be sufficiently used in combination with a speed control method as described below.

In the present embodiment, when the vibration-type motor is driven in a range where the vibration phase difference θs is greater than θs0, a frequency control in which the driving phase difference θk is fixed at 20 degrees to change the driving frequency (hereinafter, referred to as a frequency control at a phase difference of 20 degrees) is performed.

When the vibration-type motor is driven in a state where the vibration phase difference θs is θs0 (including a case where the vibration phase difference θs is nearly equal to θs0), a phase difference control in which the driving frequency is fixed to f0 to change the driving phase difference (hereinafter, referred to simply as a phase difference control) is performed.

In addition, when the vibration-type motor is driven in a range where the vibration phase difference θs is smaller than θs0, the frequency control in which the driving phase difference θk is fixed to 90 degrees to change the driving frequency (hereinafter, referred to as a frequency control at the phase difference of 90 degrees) is performed.

Next, a specific speed control method of the vibration-type motor will be described. In the present embodiment, first of all, the driving speed of the vibration-type motor is increased up to a target speed. After a remaining driving amount is equal to or less than a predetermined amount, the target speed is gradually decreased to reduce the driving speed, and the drive of the vibration-type motor stops when the vibration-type motor is driven up to a target position where the remaining driving amount is zero or just before zero. Thus, in the present embodiment, the speed control from the start to the stop of the rotation of the vibration-type motor by acceleration and deceleration is performed in combination with the three speed control methods described above.

The target speed (T-SPD) and the driving amount (FOPC) are instructed from an outside to the microcomputer 1 which controls the drive of the vibration-type motor, or they are set inside the microcomputer 1. The microcomputer 1 starts the driving control of the vibration-type motor using the instruction or the setting as a trigger. The target speed (T-SPD) is information for controlling the vibration-type motor at a predetermined rotational speed, and is information which is represented by the pulse width of the pulse signal outputted from the encoder 33 described above. The driving amount (FOPC) is information which is represented by a count value of the pulse signal (hereinafter, referred to as a pulse count value or a pulse number) outputted from the encoder 33.

Figure 5:
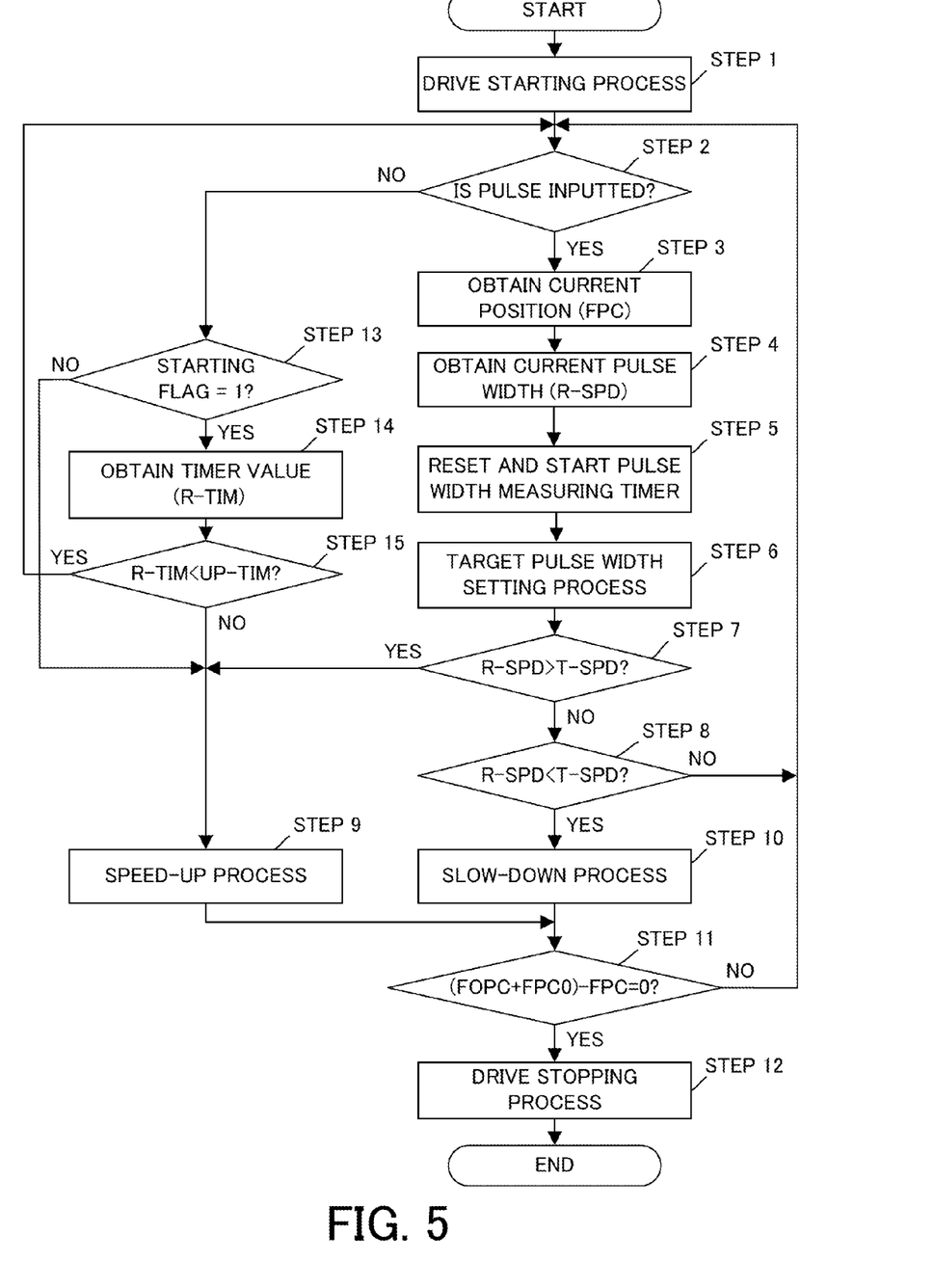
FIG. 5 is a control flowchart of a vibration-type motor in Embodiment 1.
Figure 6:
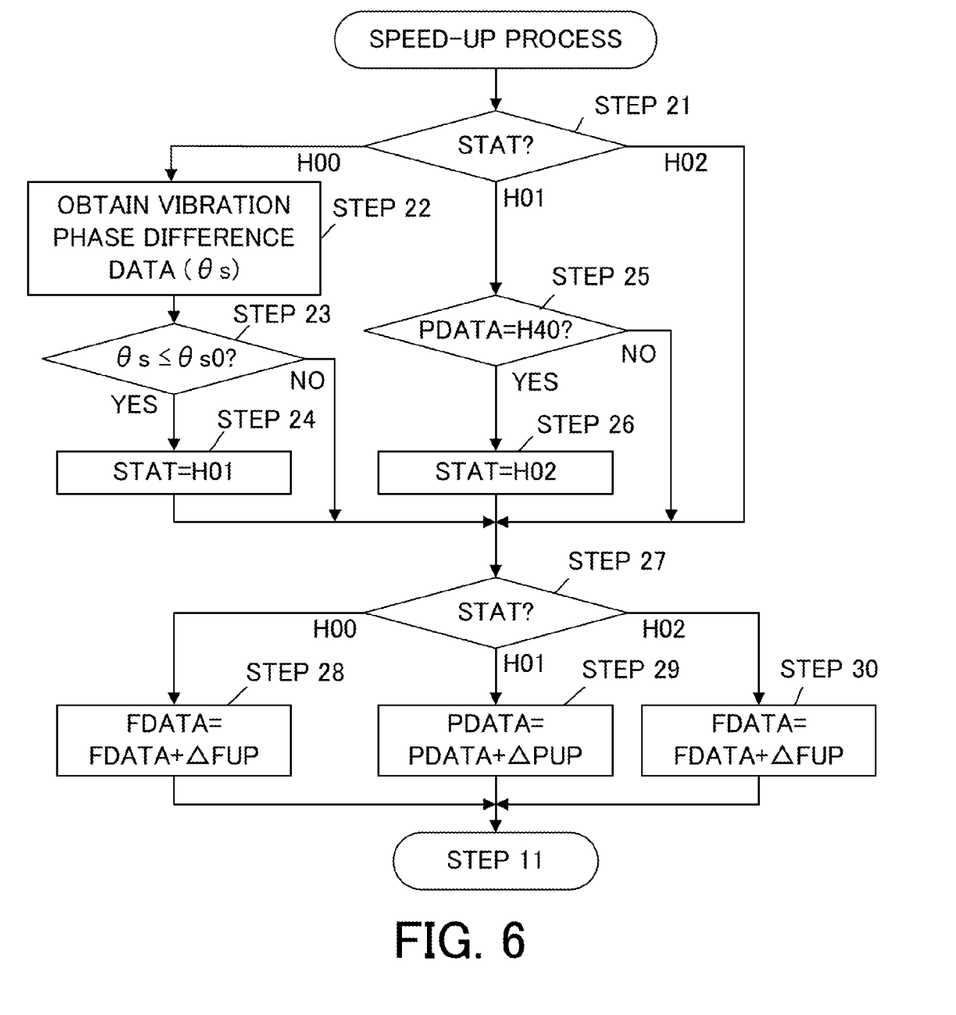
FIG. 6 is a control flowchart of a vibration-type motor in Embodiment 1.
Figure 7:
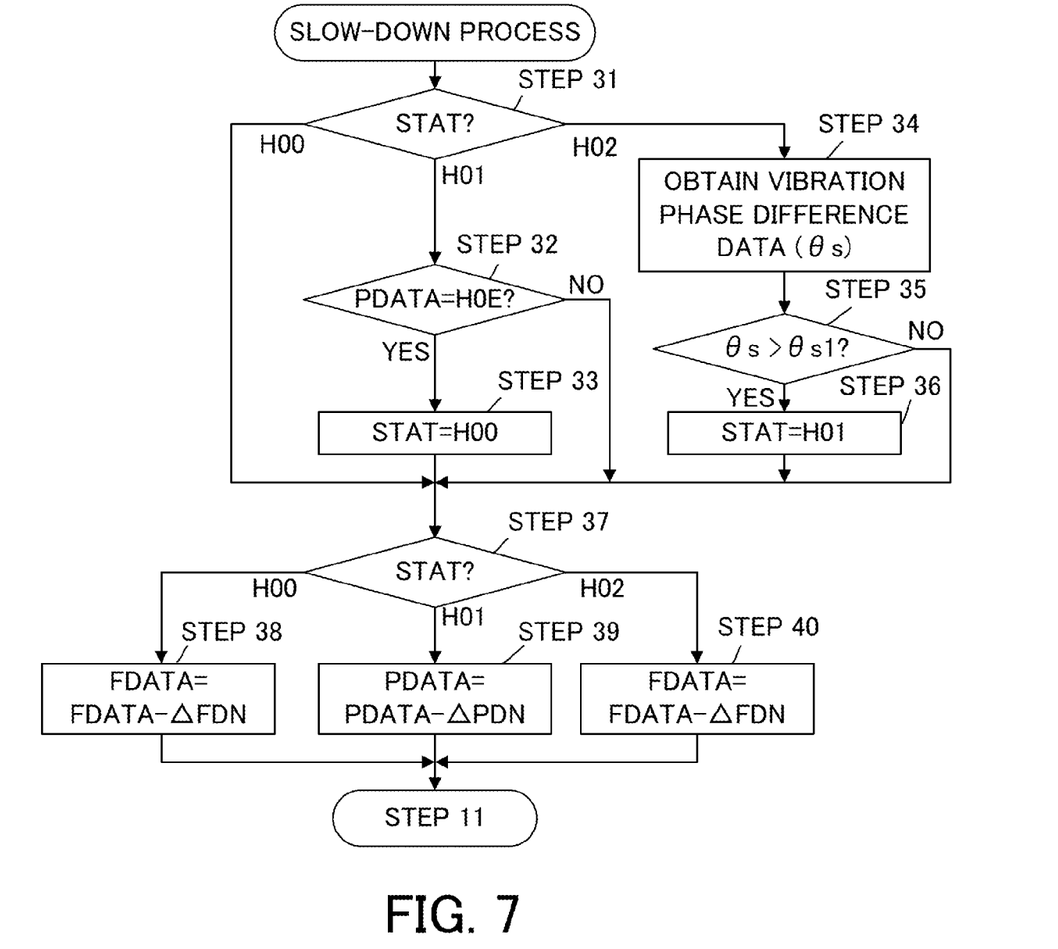
FIG. 7 is a control flowchart of a vibration-type motor in Embodiment 1.
Figure 8A:
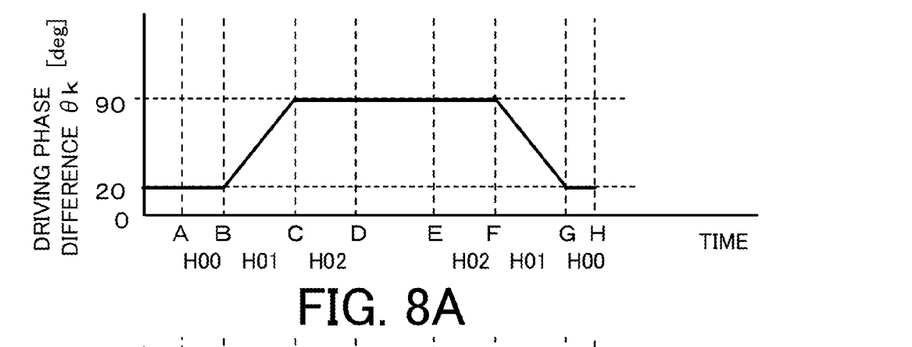
FIGS. 8A to 8D are control characteristic diagrams in Embodiment 1.
Figure 8B:
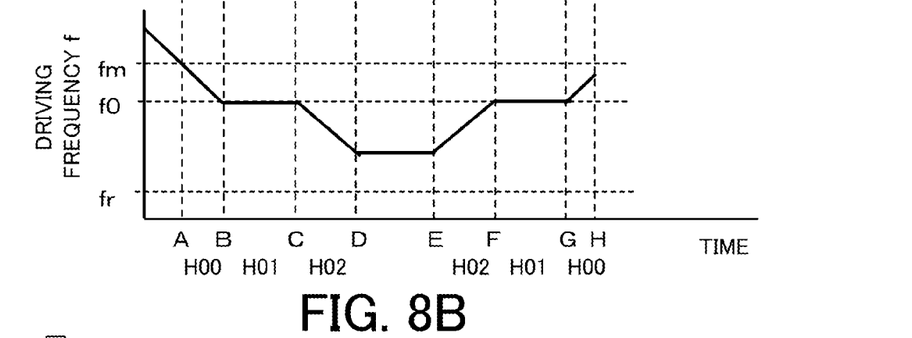
Figure 8C:
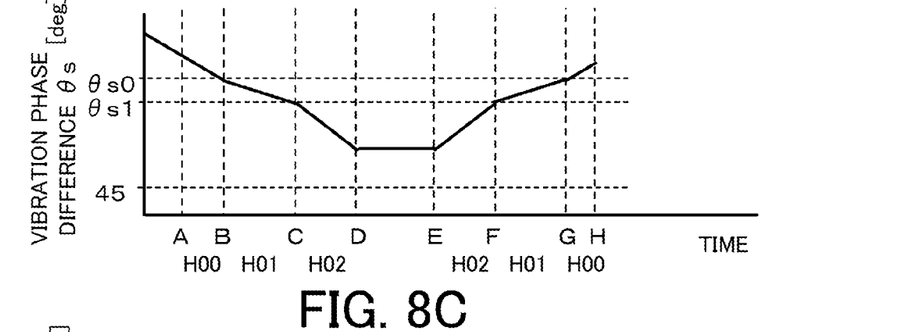
Figure 8D:
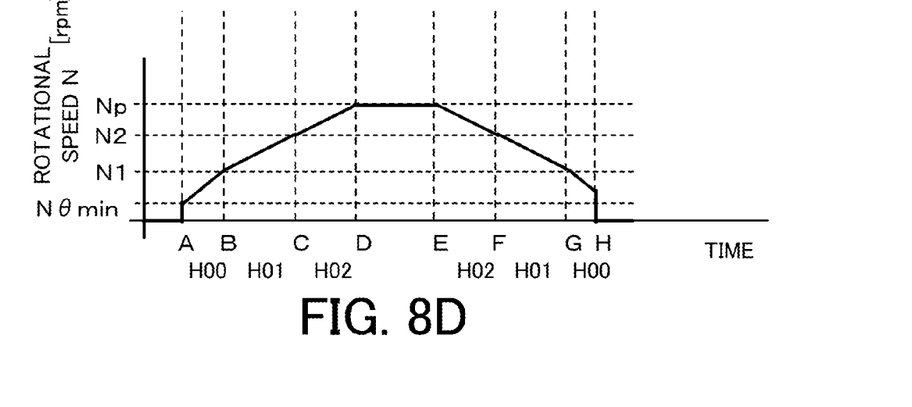

Referring to flowcharts illustrated in FIGS. 5 to 7, the speed control process from the start of the driving to the end of the driving when the vibration-type motor is driven in a positive rotation will be described. The speed control process is performed by the microcomputer 1 in accordance with a computer program. First of all, referring to FIG. 5, a main flow of the speed control process will be described.

[Step 1]

The microcomputer 1 performs a drive starting process. Specifically, it works the DC-DC converter 4 to generate a voltage required for driving the vibration-type motor. Furthermore, it sets the frequency data (FDATA) to H00 to set the driving frequency to the maximum frequency capable of being set with respect to the A-phase and B-phase signals, and it sets the phase difference data (PDATA) to H0E to set the driving phase difference to 20 degrees. Thus, the frequency control at the phase difference of 20 degrees is initially set. In addition, a control status (STAT) is set to H00 which indicates a state where a frequency control at the phase difference of 20 degrees is performed.

Furthermore, the microcomputer 1 reads a current pulse count value to store it as FPC0 in a memory (not shown) in the microcomputer 1, and then the output enable signal (OUT-EN) is set to H to enable the output of the A-phase and B-phase signals. Thus, the drive of the vibration-type motor is started. At this time, the microcomputer 1 also clears a starting flag to zero. Then, the flow proceeds to STEP 2.

[Step 2]

The microcomputer 1 determines whether or not the pulse signal is inputted from the encoder 33. The flow proceeds to STEP 3 when the pulse signal is inputted, on the other hand, the flow proceeds to STEP 13 when the pulse signal is not inputted.

[Step 3]
The microcomputer 1 obtains a pulse count value FPC which indicates a current position. When a first pulse signal is inputted after the drive is started, the microcomputer 1 determines that the vibration-type motor is started and it provides one as a starting flag. Next, the flow proceeds to STEP 4.
[Step 4]
The microcomputer 1 measures the pulse width of the pulse signal from the encoder 33 using the pulse width measuring timer to read a value of the pulse width (R-SPD). Next, the flow proceeds to STEP 5.
[Step 5]
The microcomputer 1 resets the value of the pulse width measuring timer so as to be able to measure the pulse width of the subsequent pulse signal from the encoder 33. Next, the flow proceeds to STEP 6.
[Step 6]
The microcomputer 1 performs a setting process of a target speed (a target pulse width). Specifically, it determines whether or not a value of (FOPC+FPC0)−FPC that is a remaining driving amount up to the target position is equal to or less than the deceleration pulse number, and newly obtains T-SPD to change the target speed if it is equal to or less than the deceleration pulse number. The deceleration pulse number, which is previously stored in a memory in the microcomputer 1, means a remaining driving amount at which the vibration-type motor starts reducing the speed of the vibration-type motor. T-SPD, which is previously stored in the memory in the microcomputer 1, is read from table data indicating the relationship between the remaining driving amount and the target speed to be set. Thus, the microcomputer 1 sequentially updates the target speed so as to gradually decelerate the vibration-type motor to be stopped when the remaining driving amount (FOPC+FPC0)−FPC is equal to or less than the deceleration pulse number. Then, the flow proceeds to STEP 7.
[Step 7]
The microcomputer 1 determines whether or not R-SPD which represents the current driving speed obtained in STEP 4 is greater than T-SPD which represents the target speed. If R-SPD is greater, the flow proceeds to STEP 9, on the other hand, if not, the flow proceeds to STEP 8. Since R-SPD and T-SPD are data relating to pulse widths, the fact that R-SPD is greater means that the current driving speed is slower than the target speed.
[Step 8]
The microcomputer 1 determines whether or not R-SPD which represents the current driving speed is smaller than T-SPD which represents the target speed. If R-SPD is smaller, the flow proceeds to STEP 10, and on the other hand, if not, the flow returns to STEP 2. The fact that R-SPD is smaller means that the current driving speed is faster than the target speed.
[Step 9]
The microcomputer 1 performs a speed-up process in order to increase the driving speed of the vibration-type motor up to the target speed. The speed-up process will be described in detail with reference to FIG. 6 later. Then, the flow proceeds to STEP 11.
[Step 10]
The microcomputer 1 performs a slow-down process in order to decrease the driving speed of the vibration-type motor to the target speed. The slow-down process will be described in detail with reference to FIG. 7 later. Then, the flow proceeds to STEP 11.

[Step 11]
The microcomputer 1 determines whether or not the remaining driving amount (FOPC+FPC0)−FPC is zero. If it is zero, i.e. the vibration-type motor has reached the target position, the flow proceeds to STEP 12, and on the other hand, if it is not zero, i.e. the vibration-type motor has not reached the target position yet, the flow returns to STEP 2.
[Step 12]
The microcomputer 1 sets the output enable signal (OUT-EN) to L to inhibit outputs of the A-phase and B-phase signals to stop the drive of the vibration-type motor. It also stops the operation of the DC-DC converter 4. Then, the process is finished.
[Step 13]
The microcomputer 1 determines whether or not the vibration-type motor has already started, i.e. the starting flag is 1, when it determined that the pulse signal was not inputted in STEP 2. When the starting flag is 0, the flow proceeds to STEP 9 to perform the speed-up process. On the other hand, when the starting flag is 1, the flow proceeds to STEP 14.
[Step 14]
The microcomputer 1 reads R-TIM that is a current value of the pulse width measuring timer. The value of R-TIM represents a period from the time of the input of the previous pulse signal to the current time.
[Step 15]
The microcomputer 1 determines whether or not the value of R-TIM is shorter than a permissible time UP-TIM. When the value of R-TIM is shorter than the value of UP-TIM, the flow returns to STEP 2. On the other hand, when the value of R-TIM is longer (is equal to or greater) than the value of UP-TIM, the flow proceeds to STEP 9 to perform the speed-up process. This is a process for preventing the stop of the vibration-type motor as a result of the driving speed being too slow despite driving the vibration-type motor.

Next, referring to FIG. 6, the speed-up process performed in STEP 9 will be described.
[Step 21]
The microcomputer 1 determines the control status (STAT). When the value of STAT is equal to H00 (STAT=H00), i.e. the control status is in a frequency control state at the phase difference of 20 degrees, the flow proceeds to STEP 22. On the other hand, the value of STAT is equal to H01 (STAT=H01), i.e. the control status is in a phase difference control state, the flow proceeds to STEP 25. When the value of STAT is equal to H02 (STAT=H02), i.e. the control status is in a frequency control state at a phase difference of 90 degrees, the flow proceeds to STEP 27.
[Step 22]
The microcomputer 1 measures the vibration phase difference θs that is a phase difference between the B-phase and S-phase signals to read the measured value. Then, the flow proceeds to STEP 23.
[Step 23]
The microcomputer 1 determines whether or not the vibration phase difference θs is equal to or less than a value of θs0 (θs≤θs0). The value of θs0 is a vibration phase difference at the frequency f0 that is a sufficiently-higher frequency relative to the resonance frequency fr and that is lower than the starting frequency fm, as illustrated in FIG. 4B. When θs≤θs0 is satisfied, the flow proceeds to STEP 24. On the other hand, when θs≥θs0 is satisfied, the flow proceeds to STEP 27.
[Step 24]
The microcomputer 1 sets the control status (STAT) to H01 in order to perform the speed-up process by the phase difference control, i.e. in order to switch the frequency control at the phase difference of 20 degrees to the phase difference control. Then, the flow proceeds to STEP 27.

[Step 25]

The microcomputer 1 determines whether or not the value of PDATA is equal to H40 (PDATA=H40). If the value of PDATA is equal to H40, i.e. the driving phase difference θk becomes 90 degrees by the phase difference control, the flow proceeds to STEP 26. On the other hand, if the value of PDATA is not equal to H40 (PDATA≠H40), the flow proceeds to STEP 27.

[Step 26]

The microcomputer 1 sets the control status (STAT) to H03 in order to perform the speed-up process by the frequency control at the phase difference of 90 degrees, i.e. in order to switch the phase difference control to the frequency control at the phase difference of 90 degrees. Then, the flow proceeds to STEP 27.

[Step 27]

The microcomputer 1 determines the control status (STAT). The flow proceeds to STEP 28 if the value of STAT is equal to H00 (STAT=H00). The flow proceeds to STEP 29 if the value of STAT is equal to H01 (STAT=H01). The flow proceeds to STEP 30 if the value of STAT is equal to H02 (STAT=H02).

[Step 28]

The microcomputer 1 sets the frequency data FDATA to a current frequency data FDATA+ΔFUP (FDATA=FDATA+ΔFUP) to lower the driving frequency f in the frequency control at the phase difference of 20 degrees. Thus, the driving speed of the vibration-type motor is increased. The value of ΔFUP is a constant that determines the extent of the acceleration, which may be a fixed value or may also be changed in accordance with a condition such as a speed deviation. Then, the flow proceeds to STEP 11.

[Step 29]

The microcomputer 1 sets the phase difference data PDATA to a current phase difference data PDATA+ΔPUP (PDATA=PDATA+ΔPUP) to increase the driving phase difference in the phase difference control. Before this step, an initial value H0E is set as the value of PDATA in STEP 1, and the drive of the vibration-type motor is started at the driving phase difference θk of 20 degrees. Accordingly, in order to drive the vibration-type motor in a positive rotation direction to increase the speed, the value of PDATA needs to be increased to make the driving phase difference θk closer to 90 degrees. The value of ΔPUP is a constant that determines the extent of the acceleration, which may be a fixed value or may also be changed in accordance with a condition such as a speed deviation.

As a result of the process (PDATA=PDATA+ΔPUP), if the value of PDATA is greater than the value of H40 (PDATA>H40), the value of PDATA is set to the value of H40 (PDATA=H40). Then, the flow proceeds to STEP 11.

[Step 30]

The microcomputer 1 sets the value of FDATA to the value of FDATA+ΔFUP (FDATA=FDATA+ΔFUP) to decrease the driving frequency f in the frequency control at the phase difference of 90 degrees. If the speed up is additionally needed in spite of setting the driving phase difference θk to 90 degrees (PDATA=H40), the value of FDATA is increased to lower the driving frequency f to come close to the resonance frequency. The value of ΔFUP is a constant that determines the extent of the acceleration, which may be a fixed value or may also be changed in accordance with a condition such as a speed deviation. Then, the flow proceeds to STEP 11.

Next, referring to FIG. 7, the slow-down process performed in STEP 10 will be described.

[Step 31]

The microcomputer 1 determines the control status (STAT). If the value of STAT is equal to H00 (STAT=H00), i.e. the control status is in the frequency control state at the phase difference of 20 degrees, the flow proceeds to STEP 37. On the other hand, if the value of STAT is equal to H01 (STAT=H01), i.e. the control status is in the phase difference control state, the flow proceeds to STEP 32. If the value of STAT is equal to H02 (STAT=H02), i.e. the control status is in the frequency control state at the phase difference of 90 degrees, the flow proceeds to STEP 34.

[Step 32]

The microcomputer 1 determines whether or not the value of PDATA is equal to H0E (PDATA=H0E). If the value of PDATA is equal to H0E (PDATA=H0E), i.e. the driving phase difference θK is 20 degrees in the phase difference control, the flow proceeds to STEP 33. On the other hand, if the value of PDATA is not equal to H0E (PDATA≠H0E), the flow proceeds to STEP 37.

[Step 33]

The microcomputer 1 sets the control status (STAT) to H00 in order to perform the slow-down process in the frequency control at the phase difference of 20 degrees, i.e. in order to switch the phase difference control to the frequency control at the phase difference of 20 degrees. Then, the flow proceeds to STEP 37.

[Step 34]

The microcomputer 1 measures the vibration phase difference θs that is a phase difference between the B-phase signal and the S-phase signal to read the measured value. Then, the flow proceeds to STEP 35.

[Step 35]

The microcomputer 1 determines whether or not the vibration phase difference θs is greater than a value of θs1 (θs>θs1). The value of θs1 is a vibration phase difference near the frequency f0 that is a sufficiently-higher frequency relative to the resonance frequency fr and that is lower than the starting frequency fm, as illustrated in FIG. 4B. As the vibration phase difference θs1, the vibration phase difference at the time of switching from the phase difference control to the frequency control (STEP 26) in the speed-up control may be stored to be used, or the same frequency as the vibration phase difference θs0 may also be used. When θs is greater than θs1 (θs>θs1), the flow proceeds to STEP 36. On the other hand, when θs is equal to or less than θs1 (θs≤θs1), the flow proceeds to STEP 37.

[Step 36]

The microcomputer 1 sets the control status (STAT) to H01 in order to perform the slow-down process by the phase difference control, i.e. in order to switch the frequency control at the phase difference of 90 degrees to the phase difference control. Then, the flow proceeds to STEP 37.

[Step 37]

The microcomputer 1 determines the control status (STAT). The flow proceeds to STEP 38 if the value of STAT is equal to H00 (STAT=H00), and the flow proceeds to STEP 39 if the value of STAT is equal to H01 (STAT=H01). The flow proceeds to STEP 40 if the value of STAT is equal to H02 (STAT=H02).

[Step 38]

The microcomputer 1 sets the value of FDATA to a value of FDATA−ΔFDN (FDATA=FDATA−ΔFDN) to increase the driving frequency f in the frequency control at the phase difference of 20 degrees. If the slow-down process is additionally needed in spite of setting the driving phase difference θk to 20 degrees (PDATA=H0E), the value of FDATA is decreased to increase the driving frequency f. The value of ΔFDN is a constant that determines the extent of the deceleration, which may be a fixed value or may also be changed in accordance with a condition such as a speed deviation. Then, the flow proceeds to STEP 11.

[Step 39]

The microcomputer 1 sets the phase difference data PDATA to a current phase difference data PDATA−ΔPDN (PDATA=PDATA−ΔPDN) to decrease the driving phase difference in the phase difference control. In order to drive the vibration-type motor in a positive rotation direction to decrease the speed, the value of PDATA needs to be decreased to make the driving phase difference θk closer to 20 degrees. The value of ΔPDN is a constant that determines the extent of the deceleration, which may be a fixed value or may also be changed in accordance with a condition such as a speed deviation.

As a result of the process (PDATA=PDATA−ΔPDN), if the value of PDATA is smaller than H0E (PDATA<H0E), the value of PDATA is set to H0E (PDATA=H0E). Then, the flow proceeds to STEP 11.

[Step 40]

The microcomputer 1 sets the value of FDATA to a value of FDATA−ΔFDN (FDATA=FDATA−ΔFDN) to increase the driving frequency f in the frequency control at the phase difference of 90 degrees. Thus, the driving speed of the vibration-type motor is decreased. The value of ΔFDN is a constant that determines the extent of the deceleration, which may be a fixed value or may also be changed in accordance with a condition such as a speed deviation. Then, the flow proceeds to STEP 11.

Next, referring to FIGS. 8A to 8D, an example of the changes of the driving speed of the vibration-type motor by the above speed control process will be described. In the embodiment, the target speed is set to a rotational speed Np which is higher than the rotational speed N0 illustrated in FIG. 4B. After the vibration-type motor is started, it is accelerated up to the rotational speed Np and then is decelerated to be stopped.

In Each of FIGS. 8A to 8D, a horizontal axis indicates a time and A to H indicate timings. H00, H01, and H02 indicate control statuses between the timings of A to H (see FIGS. 6 and 7). A vertical axis in FIG. 8A indicates a driving phase difference θk, which increases upward. A vertical axis in FIG. 8B indicates a driving frequency f, which heightens upward. A vertical axis in FIG. 8C indicates a vibration phase difference θs, which increases upward. A vertical axis in FIG. 8D indicates a rotational speed N, which heightens upward.

The driving frequency f is set to the maximum frequency and the driving phase difference θk is set to 20 degrees to start driving the vibration-type motor to lower the driving frequency, i.e. to perform the speed-up process by the frequency control at the phase difference of 20 degrees, to accelerate the vibration-type motor. In this case, the vibration-type motor is started, i.e. the rotation of the vibration-type motor is started, at the timing of A at which the driving frequency is nearly equal to fm, and then the rotational speed is increased.

At the timing of B, the vibration phase difference θs is θs0. Then, the driving frequency is fixed to move the driving phase difference θk closer to 90 degrees, i.e. to perform the speed-up process by the phase difference control, to accelerate the vibration-type motor.

At the timing of C, the driving phase difference θk is 90 degrees. Then, the driving phase difference θk is fixed to 90 degrees to decrease the driving frequency f, i.e. to perform the speed-up process by the frequency control at the phase difference of 90 degrees, to accelerate the vibration-type motor.

At the timing of D, the rotational speed of the vibration-type motor reaches a target rotational speed Np. Therefore, decreasing the driving frequency f is stopped, and then the driving frequency f and the driving phase difference θs are maintained as long as the rotational speed does not change due to a load change or the like.

At the timing of E, the remaining driving amount is a predetermined amount. Then, the target rotational speed is decreased from Np. Along with the decrease of the target rotational speed, the driving frequency f is heightened, i.e. the slow-down process is performed by the frequency control at the phase difference of 90 degrees, to decelerate the vibration-type motor.

At the timing of F, the vibration phase difference θs becomes θs1. Then, the driving phase difference θk is decreased, i.e. the slow-down process is performed by the phase difference control, to decelerate the vibration-type motor.

At the timing of G, the driving phase difference θk becomes 20 degrees. Then, the driving phase difference θk is fixed to 20 degrees to heighten the driving frequency f, i.e. to perform the slow-down process is performed by the frequency control at the phase difference of 20 degrees, to decelerate the vibration-type motor.

At the timing of H, the remaining driving amount becomes zero. In other words, the vibration-type motor reaches the target position. Thus, the driving of the vibration-type motor is stopped.

As above, in the present embodiment, the frequency control in which the driving phase difference is fixed (furthermore, two frequency controls having different driving phase differences to be fixed) and the phase difference control in which the driving frequency is fixed are alternately performed so that at least one of a plurality of frequency controls or a plurality of phase difference controls are included to increase and decrease the driving speed of the vibration-type motor. Thus, the original speed variable range of the vibration-type motor is sufficiently used to be able to increase in width of selecting the driving speed of the vibration-type motor.

In the above embodiment, in order to switch the speed control method without stopping the rotation of the vibration-type motor, the case in which the phase difference between the S-phase signal from the S-phase piezoelectric element to detect the vibration state of the stator and the B-phase signal that is the driving frequency signal is described. However, since the vibration state of the stator can also be detected by using an amplitude level of the S-phase signal, the speed control method may also be switched by using the amplitude level. A frequency or a driving speed at which the speed control method can be switched without stopping the rotation of the vibration-type motor may also be previously set to switch the speed control method based on the information.

Embodiment 2

An example where the vibration-type motor controller described in Embodiment 1 is applied to an interchangeable lens as an optical apparatus mounted on a single-lens reflex camera will be described as Embodiment 2. In the present embodiment, an optical element (a focus lens) provided as a driven member in the interchangeable lens is moved by the driving force of the vibration-type motor to control the drive of the vibration-type motor using the vibration-type motor controller described in Embodiment 1.

In the present embodiment, a case in which the speed control described in Embodiment 1 (a first speed control) and a second speed control which performs a speed control of the vibration-type motor only by using the frequency control without performing the phase difference control are switched will be described.

Figure 9:
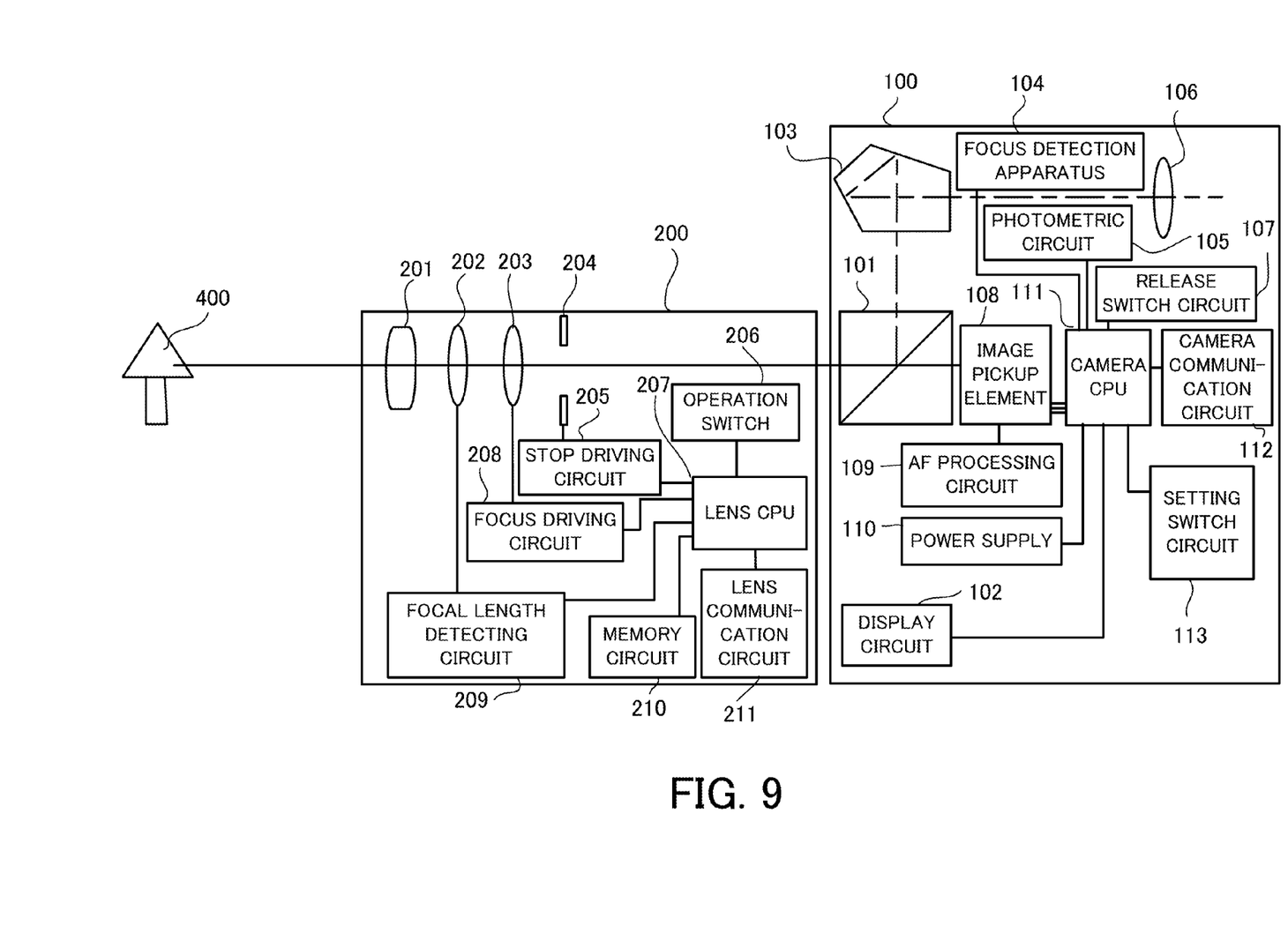
FIG. 9 is a block diagram illustrating a configuration of a camera system that is Embodiment 2 of the present invention.

FIG. 9 illustrates a camera system which is constituted of the single-lens reflex camera and the interchangeable lens in the present embodiment. In FIG. 9, reference numeral 100 denotes a signal-lens reflex camera (hereinafter, referred to as a camera), and reference numeral 200 denotes an interchangeable lens detachable from the camera 100.

In the interchangeable lens 200, an imaging optical system constituted of a front lens unit 201, a zoom lens unit 202, a focus lens unit 203, and a stop 204 is provided.

In the camera 100, a prism 101 embedded with a fixed half mirror is provided. Luminous flux from an object 400 passes through the imaging optical system to enter the prism 101 in the camera 100 as imaging luminous flux.

In the interchangeable lens 200, reference numeral 205 denotes a stop driving circuit, which controls an aperture diameter of the stop 204 depending upon a signal from a lens CPU 207. Reference numeral 206 denotes an operation switch in which manual operation switches for zooming, focusing, and the stop, a setting switch for switching the auto/manual focusing, and the like are provided.

The lens CPU 207 communicates information with a camera CPU 111 via a lens communication circuit 211 and a camera communication circuit 102, and also governs the control in the interchangeable lens 200. Reference numeral 208 denotes a focus driving circuit, which includes the vibration-type motor and the vibration-type motor controller described in Embodiment 1 and controls vibration-type motor, i.e. the driving of the focus lens unit 203 in an optical axis direction, depending upon the signal from the lens CPU 207.

Reference numeral 209 denotes a focal length detecting circuit, which detects a position of the zoom lens unit 202 to detect a focal length of the imaging optical system.

Reference numeral 210 denotes a memory circuit, which includes a ROM. The memory circuit 210 stores an ID of the interchangeable lens 200 (a product part number, a serial number, or the like), focal length information, focus sensitivity information, or the like, and the information are read out by the lens CPU 207 as needed.

In the camera 100, the imaging luminous flux transmitting through the fixed half mirror of the prism 101 forms an object image on an imaging plane of an image pickup element 108 such as a CCD sensor or a CMOS sensor. The imaging luminous flux reflected on the fixed half mirror of the prism 101 enters the pentaprism 103.

The luminous flux separated in the pentaprism 103 enters a focus detection apparatus 104. The focus detection apparatus 104 detects a focus state of the imaging optical system by a so-called phase difference detection method. The focus detection signal (the phase difference signal) from the focus detection apparatus 104 is inputted to the camera CPU 111. A photometric circuit 105 performs a photometry using the luminous flux from the pentaprism 103. An output signal from the photometric circuit 105 is inputted to the camera CPU 111.

On the other hand, the luminous flux passing through the pentaprism 103 passes through a finder optical system 106 to be visible by a photographer as an optical finder image.

The image pickup element 108 performs a photoelectric conversion of the object image formed on the imaging plane to output an electric signal. The output signal is amplified to be inputted to the camera CPU 111 as a digital video signal (an image pickup signal). The camera CPU 111 uses the video signal to generate a moving image or a still image. The digitalized video signal is also inputted to an AF processing circuit 109. The AF processing circuit 109 extracts a high-frequency component contained in the digital video signal to generate an AF evaluated value. Thus, a focus state of the imaging optical system can be detected by a so-called contrast detection method. The AF evaluated value is inputted to the camera CPU 111.

The camera CPU 111 calculates a defocus amount of the imaging optical system based on the phase difference signal from the focus detection apparatus 104 to convert the defocus amount into a movement amount of the focus lens unit 203 to obtain an in-focus state. Then, the information of the converted driving amount is contained in focus driving commands to be sent to the lens CPU 207.

The lens CPU 207 transforms the received converted driving amount into the pulse number described in Embodiment 1 to be inputted to the focus driving circuit 208. The vibration-type motor controller (the microcomputer 1) in the focus driving circuit 208 obtains the pulse number as an FOPC to control the driving of the vibration-type motor at the target speed depending upon the FOPC read from the table data described above. Thus, the focus lens unit 203 is moved in the optical axis direction to be able to obtain the in-focus state by the phase difference detection method.

Then, the camera CPU 111 sends the focus driving command to the lens CPU 207 so that the AF evaluated value is peaked to move the lens unit 203. The lens CPU 207 drives the vibration-type motor by predetermined minute amounts via the focus driving circuit 208 to move the focus lens unit 203. Thus, highly accurate in-focus state can be obtained by the contrast detection method.

The camera 100 is provided with a power supply 110, a release switch circuit 107, a display circuit 112, and a setting switch circuit 113.

Figure 10:
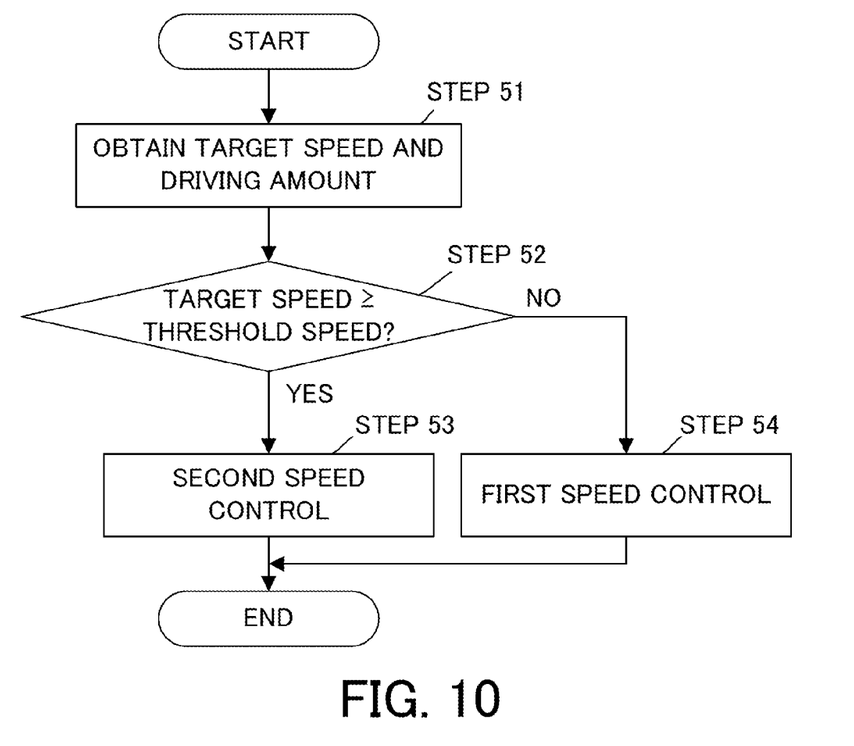
FIG. 10 is a control flowchart of a vibration-type motor in Embodiment 2.

Before starting the vibration-type motor, the microcomputer 1 selects one of a first selecting control and a second selecting control to control the driving speed of the vibration-type motor by using a process described with reference to FIG. 10.

[Step 51]

The microcomputer 1 obtains the target speed (T-SPD) and the driving amount (FOPC). Then, the flow proceeds to STEP 52.

[Step 52]

The microcomputer 1 compares the obtained target speed with a predetermined threshold speed (a predetermined speed), and the flow proceeds to STEP 53 if the target speed is higher than the threshold speed. On the other hand, the flow proceeds to STEP 54 if the target speed is slower than the target speed.

[Step 53]

The microcomputer 1 controls the driving speed of the vibration-type motor by the frequency control that is a second speed control. Specifically, the phase difference data (PDATA) is set to H40 to fix the driving phase difference to 90 degrees and the frequency data (FDATA) is changed to decrease and increase the driving frequency f. More specifically, first of all, the driving frequency f is set to the maximum frequency, and then the driving frequency is decreased to start to accelerate the vibration-type motor to the target speed. When the remaining driving amount is equal to or less than a predetermined amount, the driving frequency f is increased while slowing down the target speed to be stopped at the target position. Then, the process is finished.

[Step 54]

The microcomputer 1 controls the driving speed of the vibration-type motor by the combination control of the frequency control and the phase difference control that is a first speed control. Specific process of the first speed control is as described with reference to FIGS. 5 to 7 in Embodiment 1.

According to the present embodiment, the first speed control and the second speed control are switched depending upon whether the target speed is higher or slower than the threshold speed to be able to perform a speed control of the vibration-type motor suitable for the target speed. Thus, a wasted control time can be deleted to shorten the driving time.

In the present embodiment, the case in which the first speed control and the second speed control are switched depending upon the target speed is described, but the first speed control and the second speed control may also be switched depending upon a switching command from the camera 100 to the interchangeable lens 200. Thus, the speed control of the vibration-type motor which is suitable for the operation state such as an imaging mode of the camera or the like can be performed.

In each of the above embodiment, the interchangeable lens which mounts the vibration-type motor and its controller is described. However, the present invention can also be applied to a different optical apparatus which moves an optical element or an object to be driven (a photoconductive drum, a paper feed roller, or the like) by the vibration-type motor such as an image pickup apparatus like a digital still camera or a video camera integrally with a lens, a copier, or a printer.

According to the present invention, a vibration-type motor controller capable of performing a speed control of a vibration-type motor in a wide speed variable range can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-216607, filed on Sep. 18, 2009, which is hereby incorporated by reference herein in its entirety.

What is claimed is:

1. A vibration-type motor controller which controls a driving speed of a vibration-type motor relatively moving a vibrating body in which a vibration is excited by an electromechanical energy conversion element to which a first frequency signal and a second frequency signal having a phase difference are applied, and a contacting body which contacts the vibrating body, the vibration-type motor controller comprising:
a speed controller configured to alternately switch a frequency control which changes frequencies of the first and second frequency signals while fixing the phase difference between the first frequency signal and the second frequency signal and a phase difference control which changes the phase difference while fixing the frequencies of the first and second frequency signals so that at least one of a plurality of frequency controls or a plurality of phase difference controls are included to increase and decrease the driving speed of the vibration-type motor.

2. A vibration-type motor controller according to claim 1, wherein the speed controller performs the phase difference control after the frequency control, and in performing the frequency control, changes the fixed phase difference in between a previous frequency control and a subsequent frequency control.

3. A vibration-type motor controller according to claim 1, wherein the speed controller performs the frequency control after the phase difference control, and in performing the phase difference control, changes the fixed frequency in between a previous phase difference control and a subsequent frequency control.

4. A vibration-type motor controller which controls a driving speed of a vibration-type motor relatively moving a vibrating body in which a vibration is excited by an electromechanical energy conversion element to which a first frequency signal and a second frequency signal having a phase difference are applied, and a contacting body which contacts the vibrating body, the vibration-type motor controller comprising:
a speed controller configured to switch a first speed control and a second speed control, the first speed control alternately switching a frequency control which changes frequencies of the first and second frequency signals while fixing the phase difference between the first frequency signal and the second frequency signal and a phase difference control which changes the phase difference while fixing the frequencies of the first and second frequency signals so that at least one of a plurality of frequency controls or a plurality of phase difference controls are included to increase and decrease the driving speed of the vibration-type motor, and the second speed control performing the frequency control without performing the phase difference control to increase and decrease the driving speed of the vibration-type motor.

5. A vibration-type motor controller according to claim 4, wherein the speed controller performs the first speed control when a target speed of the vibration-type motor is lower than a predetermined speed, and performs the second speed control when the target speed is higher than the predetermined speed.

6. An optical apparatus comprising:
a vibration-type motor configured to relatively move a vibrating body in which a vibration is excited by an electromechanical energy conversion element to which a first frequency signal and a second frequency signal having a phase difference are applied, and a contacting body which contacts the vibrating body;
at least one of an optical element and a member to be driven configured to be moved by a driving force from the vibration-type motor; and
a vibration-type motor controller,
wherein the vibration-type motor controller includes a speed controller configured to alternately switch a frequency control which changes frequencies of the first and second frequency signals while fixing the phase difference between the first frequency signal and the second frequency signal and a phase difference control which changes the phase difference while fixing the frequencies of the first and second frequency signals so that at least one of a plurality of frequency controls or a plurality of phase difference controls are included to increase and decrease the driving speed of the vibration-type motor.

* * * * *